United States Patent
Kasai et al.

(10) Patent No.: US 12,085,481 B2
(45) Date of Patent: Sep. 10, 2024

(54) SEAL INSPECTION DEVICE AND SEAL INSPECTION METHOD

(71) Applicant: NOK CORPORATION, Tokyo (JP)

(72) Inventors: Yuta Kasai, Fujisawa (JP); Shotaro Karube, Fujisawa (JP); Hikaru Tadano, Fujisawa (JP); Masashi Takekoshi, Fujisawa (JP); Takayuki Sakurai, Fujisawa (JP)

(73) Assignee: NOK CORPORATION (JP)

( * ) Notice: Subject to any disclaimer, the term of this patent is extended or adjusted under 35 U.S.C. 154(b) by 210 days.

(21) Appl. No.: 17/764,569

(22) PCT Filed: Aug. 31, 2020

(86) PCT No.: PCT/JP2020/032917
§ 371 (c)(1),
(2) Date: Mar. 29, 2022

(87) PCT Pub. No.: WO2021/090563
PCT Pub. Date: May 14, 2021

(65) Prior Publication Data
US 2022/0349770 A1    Nov. 3, 2022

(30) Foreign Application Priority Data

Nov. 5, 2019 (JP) ................................. 2019-200509

(51) Int. Cl.
| | |
|---|---|
| *G01M 3/20* | (2006.01) |
| *H01M 8/0271* | (2016.01) |
| *H01M 8/04664* | (2016.01) |

(52) U.S. Cl.
CPC ........... *G01M 3/20* (2013.01); *H01M 8/0271* (2013.01)

(58) Field of Classification Search
CPC .. G01M 3/20; H01M 8/0271; H01M 8/04671; H01M 2250/20; Y02E 60/50
See application file for complete search history.

(56) References Cited

FOREIGN PATENT DOCUMENTS

| | | |
|---|---|---|
| CN | 109301286 A | 2/2019 |
| JP | 2002-334713 A | 11/2002 |
| JP | 2004-028778 A | 1/2004 |

(Continued)

OTHER PUBLICATIONS

International Search Report (in English and Japanese) issued in PCT/JP2020/032917, mailed Nov. 17, 2020; ISA/JP (5 pages).

(Continued)

*Primary Examiner* — Peter J Macchiarolo
*Assistant Examiner* — Anthony W Megna Fuentes
(74) *Attorney, Agent, or Firm* — Harness, Dickey & Pierce, P.L.C.

(57) ABSTRACT

A seal inspection device includes: a first holder including a port surrounded by an inspection target, and a through hole connected to an outside-leak detection flow path; a second holder holding the inspection target between the first and second holders; an inspection-place sealing portion forming, into a closed space, a space where the inspection target is arranged, in cooperation with the first and second holders; a pressurization valve connecting the port to both a supply source of an inspection gas and an exhaust system; a detector for the inspection gas; a first measurement valve connecting the detector to the port; and a second measurement valve connecting the outside-leak detection flow path to the detector.

20 Claims, 8 Drawing Sheets

(56) References Cited

FOREIGN PATENT DOCUMENTS

| JP | 2012-251849 | A | 12/2012 |
| JP | 2016-038981 | A | 3/2016 |
| JP | 2017-072414 | A | 4/2017 |
| JP | 2018087713 | A | 6/2018 |
| JP | 2018-141712 | A | 9/2018 |

OTHER PUBLICATIONS

European Search Report issued in corresponding European Patent Application No. 20884987.7 dated Jul. 17, 2024 (7 Pages).

SEAL INSPECTION DEVICE AND SEAL INSPECTION METHOD

CROSS REFERENCE TO RELATED APPLICATIONS

This application is a U.S. National Phase Application under 35 U.S.C. 371 of International Application No. PCT/JP2020/032917, filed on Aug. 31, 2020, which claims priority to Japanese Patent Application No. 2019-200509, filed on Nov. 5, 2019. The entire disclosures of the above applications are expressly incorporated by reference herein.

BACKGROUND

Technical Field

The present invention relates to a seal inspection device and a seal inspection method.

Related Art

Generally, a cell seal used in a fuel cell for a vehicle separates, from each other, hydrogen, oxygen, and a cooling medium that cools these. Thus, an extremely high sealing performance at a level of allowing only permeation leakage is desired for the cell seal. For this reason, even a trace of leakage at a degree same as or close to that of permeation leakage is desired to be measured with high accuracy and in a short time in inspection of the cell seal used for the fuel cell for a vehicle.

Conventionally, various methods including a pressure change method have been proposed as methods for measuring such a trace of leakage with high accuracy and in a short time.

However, according to the conventional methods, there is a problem that the time taken for measurement is long or that it is difficult to measure a trace of leakage with high accuracy.

In order to solve such a problem, it is conceivable to apply a technique in which an inspection target is arranged, in an evacuatable chamber, between an intake side and an exhaust side of an inspection gas, and a trace of leakage from the inspection target is detected.

Japanese Patent Application Laid-open Publication No. 2012-251849 as one example of conventional techniques does not treat a cell seal as an inspection target, and however, aims at improving inspection accuracy of a fine-leak test on a container-shaped workpiece that includes an opening. Here, the container-shaped workpiece as an inspection target including the opening is arranged, in a chamber, between an intake port of an inspection gas and a detection system. Then, a helium gas as the inspection gas is introduced into the chamber, and occurrence or non-occurrence of the helium gas as the inspection gas is detected in the detection system.

According to the above-described conventional technique, a trace of leakage from the inspection target can be detected. However, there is room for improvement in the configuration of the inspection device.

An object of the present invention is to implement seal inspection with a simple structure and to enable the inspection to be performed with higher accuracy and in a shorter time than in the conventional case.

SUMMARY

A first aspect of the present invention is a seal inspection device including:

a first holder including
  a port surrounded by an inspection target, and
  a through hole connected to an outside-leak detection flow path;
a second holder configured to hold the inspection target between the first and second holders;
an inspection-place sealing portion configured to form, into a closed space, a space where the inspection target is arranged, in cooperation with the first holder and the second holder;
a pressurization valve configured to connect the port to both a supply source of an inspection gas and an exhaust system;
a detector for the inspection gas;
a first measurement valve configured to connect the detector to the port; and
a second measurement valve configured to connect the outside-leak detection flow path to the detector.

A second aspect of the present invention is a seal inspection method including:

holding an inspection target between a first holder and a second holder, and evacuating an inside of the inspection target, thereby forming a closed space in a vacuum state surrounded by the inspection target, the inspection target being arranged so as to surround each of a port and a through hole, the port being provided in the first holder, the through hole being connected to an outside-leak detection flow path;
introducing an inspection gas into a closed space area that is included in the closed space and that includes the port to be a measurement target; and
detecting the inspection gas that has leaked to a closed space area included in the closed space and other than the port as the measurement target.

Advantageous Effects

According to the present invention, it is possible to implement seal inspection with a simple structure and to enable the inspection to be performed with higher accuracy and in a shorter time than in the conventional case.

DETAILED DESCRIPTION

The following describes embodiments with reference to the drawings. However, the present invention is not interpreted to be limited by reason of the description of the following embodiments.

Embodiment 1

Figure 2:
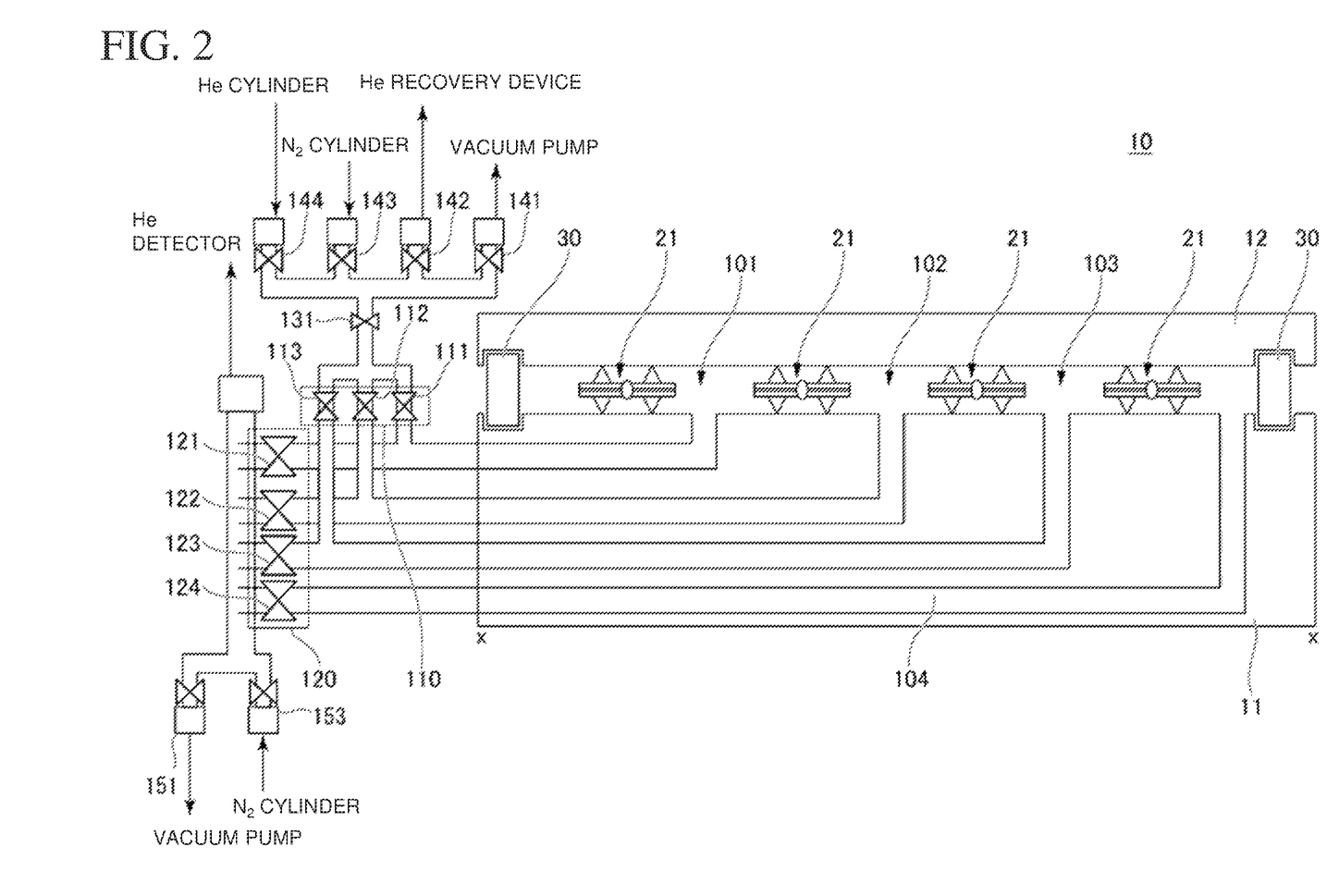
FIG. 2 illustrates an entire configuration of the seal inspection device according to the embodiment 1.

A seal inspection device 10 according to the present embodiment includes a lower holder (first holder) 11 and an upper holder (second holder) 12, as illustrated in FIG. 2. A sample 20 as an inspection target is arranged between the lower holder 11 and the upper holder 12. A helium gas is used as an inspection gas.

Hereinafter, a helium gas is referred to simply as a He gas in some cases. A gas type of the inspection gas is not particularly limited. A hydrogen gas or a concentration-reduced helium or hydrogen gas may be used instead of a helium gas. Here, a gas used for reducing the concentration is a nitrogen gas, for example.

Figure 1:
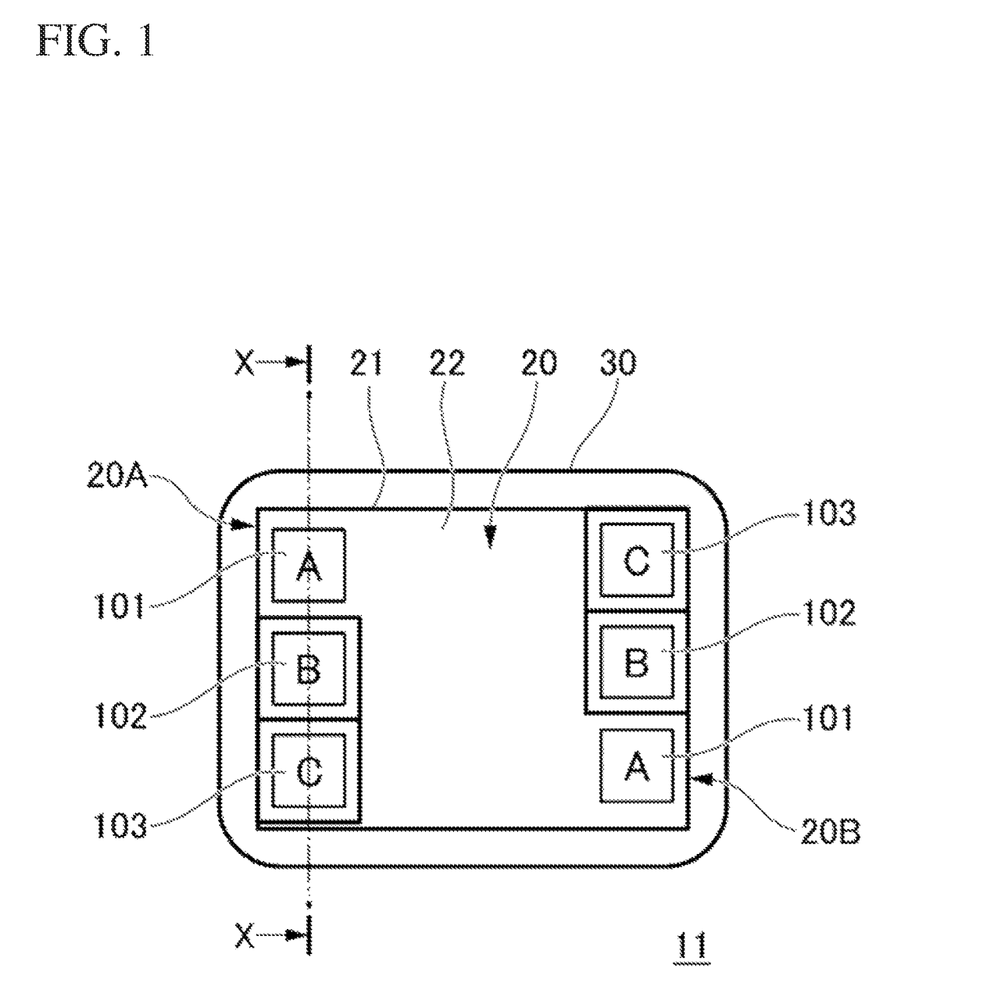
FIG. 1 illustrates a state where a sample is arranged on a lower holder provided in a seal inspection device according to an embodiment 1.

FIG. 1 illustrates a state where the sample 20 is arranged on the lower holder 11 provided in the seal inspection device 10 according to the present embodiment. An A port (first port) 101, a B port (second port) 102, and a C port (third port) 103 are provided in this order on a side of a first edge 20A that is one edge of the sample 20 illustrated in FIG. 1.

A C port (third port) 103, a B port (second port) 102, and an A port (the first port) 101 are provided on a side of a second edge 20B opposite to the first edge 20A in the sample 20. The C port 103 on the side of the second edge 20B is arranged at a position facing the A port 101 on the side of the first edge 20A. The B port 102 on the side of the second edge 20B is arranged at a position facing the B port 102 on the side of the first edge 20A. The A port 101 on the side of the second edge 20B is arranged at a position facing the C port 103 on the side of the first edge 20A.

When the seal inspection device 10 according to the present embodiment is applied to a fuel cell, the A ports 101, the B ports 102, and the C ports 103 are holes of flow paths called manifolds, and a power generation unit is formed between the two A ports 101. A large number of flow path grooves through each of which a fuel gas or an oxidation gas flows are formed in the power generation unit.

The sample 20 includes an inspection target seal 21. The inspection target seal 21 includes a part that surrounds an area 22 including both of the two A ports 101, parts that surround the respective two B ports 102, and parts that surround the respective two C ports 103.

The sample 20 is surrounded by an inspection-place sealing portion 30, as illustrated in FIG. 1. A space where the sample 20 is arranged is made a closed space. The inspection-place sealing portion 30 is a gasket for example, but is not limited to this. A gasket made of rubber is particularly preferable as the inspection-place sealing portion 30.

FIG. 2 illustrates an entire configuration of the seal inspection device 10 according to the present embodiment. FIG. 2 includes a cross-sectional view of X-X illustrated in FIG. 1.

The sample 20 including the inspection target seal 21 is held between the lower holder 11 and the upper holder 12. The inspection target seal 21 included in the sample 20 is arranged at each of a position between the inspection-place sealing portion 30 and the A port 101, a position between the A port 101 and the B port 102, a position between the B port 102 and the C port 103, and a position between the C port 103 and the inspection-place sealing portion 30.

An outside-leak detection flow path 104 is provided, in the lower holder 11, between the C port 103 and the inspection-place sealing portion 30. However, the present invention is not limited to this. At least a through hole connected to the outside-leak detection flow path 104 may be provided in the lower holder 11.

Similarly, at least a through hole is provided in the lower holder 11, also for each of the A port 101, the B port 102, and the C port 103.

FIG. 2 exemplifies a cell seal as the sample 20 including the inspection target seal 21. The cell seal is used in a fuel cell for a vehicle. The inspection target seal 21 exemplified in FIG. 2 includes two metal plates and seal portions. The metal plates are welded to each other. The seal portion is made of a rubber-like elastic material. The seal portion is provided on each of a surface included in the metal plate and facing the lower holder 11 and a surface included in the metal plate and facing the upper holder 12. These seal portions are separated from each other.

Here, a space between the two metal plates is sealed by the welded portion, but the present invention is not limited to this.

Examples of the rubber-like elastic material applied to the seal portion include ethylene-propylene rubber (EPDM), silicone rubber (VMQ), fluororubber (FKM), and perfluoro rubber (FFKM). However, the rubber-like elastic material is not limited to these, and may be another rubber-like elastic material.

Additionally, the inspection target seal 21 is not limited to the configuration including the metal plates. The sample 20 including the inspection target seal 21 may be formed of only the rubber-like elastic material.

The seal inspection device 10 includes a pressurization-valve group 110 and a measurement-valve group 120. The A port 101, the B port 102, and the C port 103 are connected to each of the pressurization-valve group 110 and the measurement-valve group 120.

The pressurization-valve group 110 includes an A-port pressurization valve 111, a B-port pressurization valve 112, and a C-port pressurization valve 113.

The measurement-valve group 120 includes a A-port measurement valve 121, a B-port measurement valve 122, and a C-port measurement valve 123.

The A port 101 is connected to the A-port pressurization valve 111 and the A-port measurement valve 121 via a flow path in the lower holder 11. The B port 102 is connected to the B-port pressurization valve 112 and the B-port measurement valve 122 via a flow path in the lower holder 11. The C port 103 is connected to the C-port pressurization valve 113 and the C-port measurement valve 123 via a flow path in the lower holder 11.

The outside-leak detection flow path 104 is connected to an outside-leak measurement valve 124.

For convenience, in some cases in the following description, the A-port measurement valve 121, the B-port measurement valve 122, and the C-port measurement valve 123 are referred to as first measurement valves, and the outside-leak measurement valve 124 is referred to as a second measurement valve.

The A-port pressurization valve 111, the B-port pressurization valve 112, and the C-port pressurization valve 113 are connected to an exhaust-side and intake-side valve 131. The exhaust-side and intake-side valve 131 is connected to a vacuum-pump-side valve 141 and a He-recovery-deviceside valve 142 that constitute an exhaust system, and to a nitrogen-cylinder-side valve 143 and a He-cylinder-side valve 144 that constitute an intake system.

The vacuum-pump-side valve 141 is connected to a vacuum pump for exhaust. The He-recovery-device-side valve 142 is connected to a He recovery device. A recovered He gas is appropriately reused.

The nitrogen-cylinder-side valve 143 is connected to a nitrogen ($N_2$) cylinder as a supply source of a nitrogen gas. The He-cylinder-side valve 144 is connected to a He cylinder as a supply source of helium (He) that is the inspection gas.

The A-port measurement valve 121, the B-port measurement valve 122, the C-port measurement valve 123, and the outside-leak measurement valve 124 are connected to a He detector. The He detector is a number-of-atoms measurement device that measures the number of atoms of helium (He). Here, the He detector is configured so as to quantitatively detect the number of the atoms of the leaked gas, and can detect even a trace of helium (He). The He detector is a mass spectrometer, for example.

However, examples of the He detector in the present embodiment do not include a pressure sensor. This is because when a pressure sensor is used, a waiting state is continued until pressure in a measurement target space reaches equilibrium, the measurement takes time, and it is difficult to detect a trace of leakage.

Preferably, a vacuum-pump-side valve 151 connected to a vacuum pump and a nitrogen-cylinder-side valve 153 connected to a nitrogen cylinder are connected to a side of the He detector, i.e., between the measurement-valve group 120 and the He detector, as illustrated in FIG. 2. However, the present invention is not limited to this.

Figure 3:
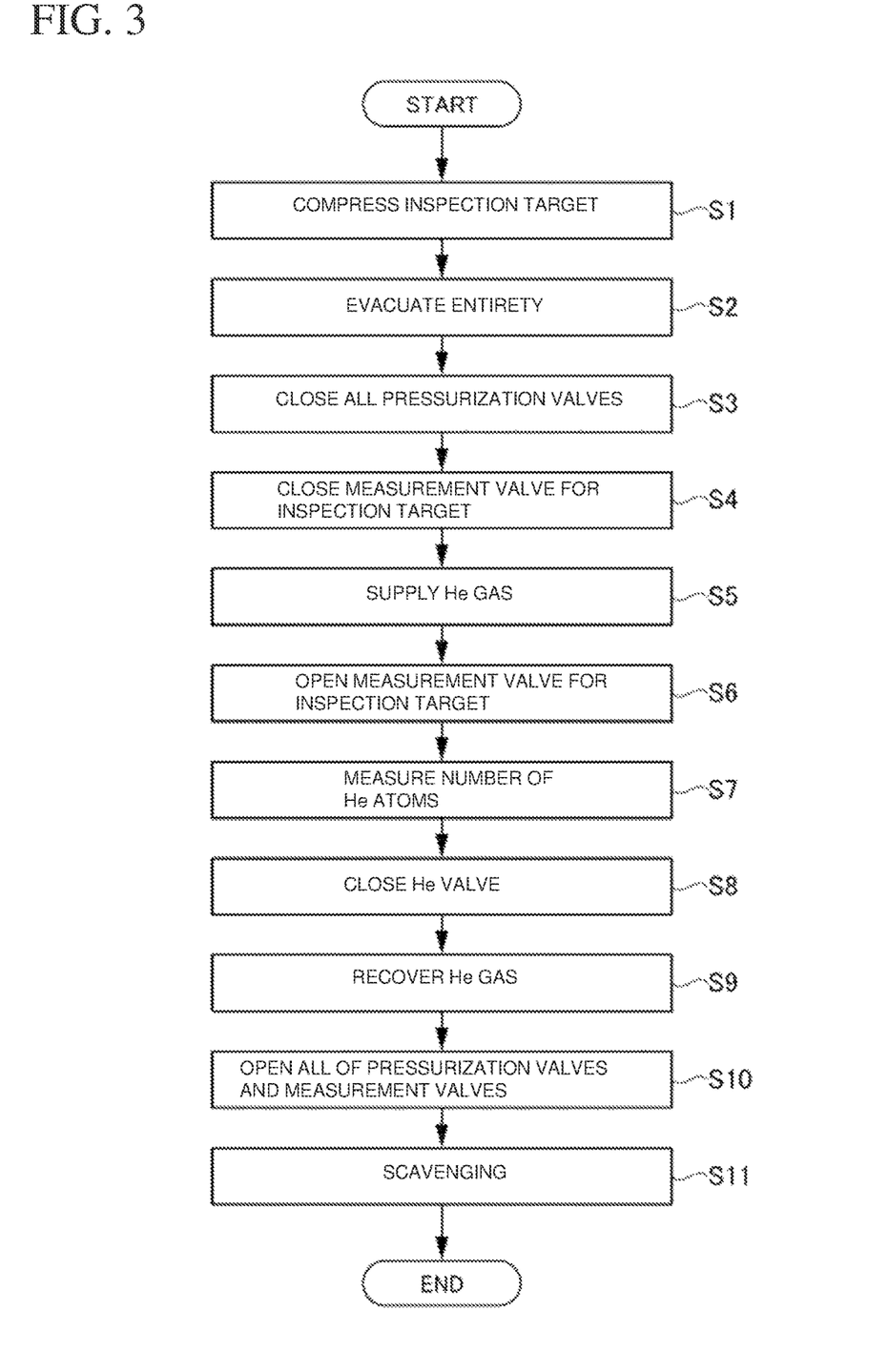
FIG. 3 is a flowchart representing a seal inspection method according to the embodiment 1 that can be applied to configurations illustrated in FIG. 1 and FIG. 2.

Next, a seal inspection method using the seal inspection device 10 according to the present embodiment is described below. FIG. 3 is a flowchart representing the seal inspection method according to the present embodiment that can be applied to the seal inspection device 10 illustrated in FIG. 1 and FIG. 2.

Here, the inspection target is the A port. The inspection target sample is set at a predetermined position on the lower holder 11. Then, processing is started.

First, the upper holder 12 is lowered in a state where the inspection target sample is set, and the sample 20 including the inspection target seal 21 as the inspection target is thereby compressed between the lower holder 11 and the upper holder 12 (S1).

The step (S1) of compressing the sample 20 may be omitted, and the processing may be started from the next step (S2) of evacuating.

Next, the vacuum-pump-side valve 141 is opened to evacuate the entirety (S2) in a state where the He-recovery-device-side valve 142, the nitrogen-cylinder-side valve 143, and the He-cylinder-side valve 144 are closed, and in a state where the exhaust-side and intake-side valve 131 and all the valves of the pressurization-valve group 110 and the measurement-valve group 120 are opened. Here, a degree of the vacuum is −100 kPa, for example. Thus, the one vacuum pump can evacuate all the ports at once.

The vacuum-pump-side valve 151 connected to the vacuum pump is connected to the side of the He detector. Accordingly, the evacuation from the side of the He detector is also possible. Thereby, time taken for the evacuation can be shortened.

After predetermined time elapses from S2, all the valves of the pressurization-valve group 110 are closed (S3).

Next, the A-port measurement valve 121 connected to the A port 101 as the inspection target is closed (S4) in a state where the measurement valve 122 for the B port as a non-target of the inspection, the measurement valve 123 for the C port as a non-target of the inspection, and the outside-leak measurement valve 124 are opened.

At this time, the vacuum-pump-side valve 141 is also closed.

Next, the He-cylinder-side valve 144 is opened to supply a He gas (S5).

Next, the A-port pressurization valve 111 is opened to supply the He gas to a space including the A port 101 as the inspection target (S6) in a state where the B-port pressurization valve 112 and the C-port pressurization valve 113 are closed.

Then, the exhaust-side and intake-side valve 131 is closed.

Next, the number of He atoms is measured by the He detector (S7).

Here, a leak amount is measured that is an amount of the He gas supplied to the A port 101 and leaked from the inspection target seal 21 into the B port 102, the C port 103, or the outside-leak detection flow path 104.

Pressurization is continued during the measurement at S7.

The valve is opened for the pressurization at the time of the pressurization. However, the valve may be closed when sufficient pressure is maintained.

Figure 4:
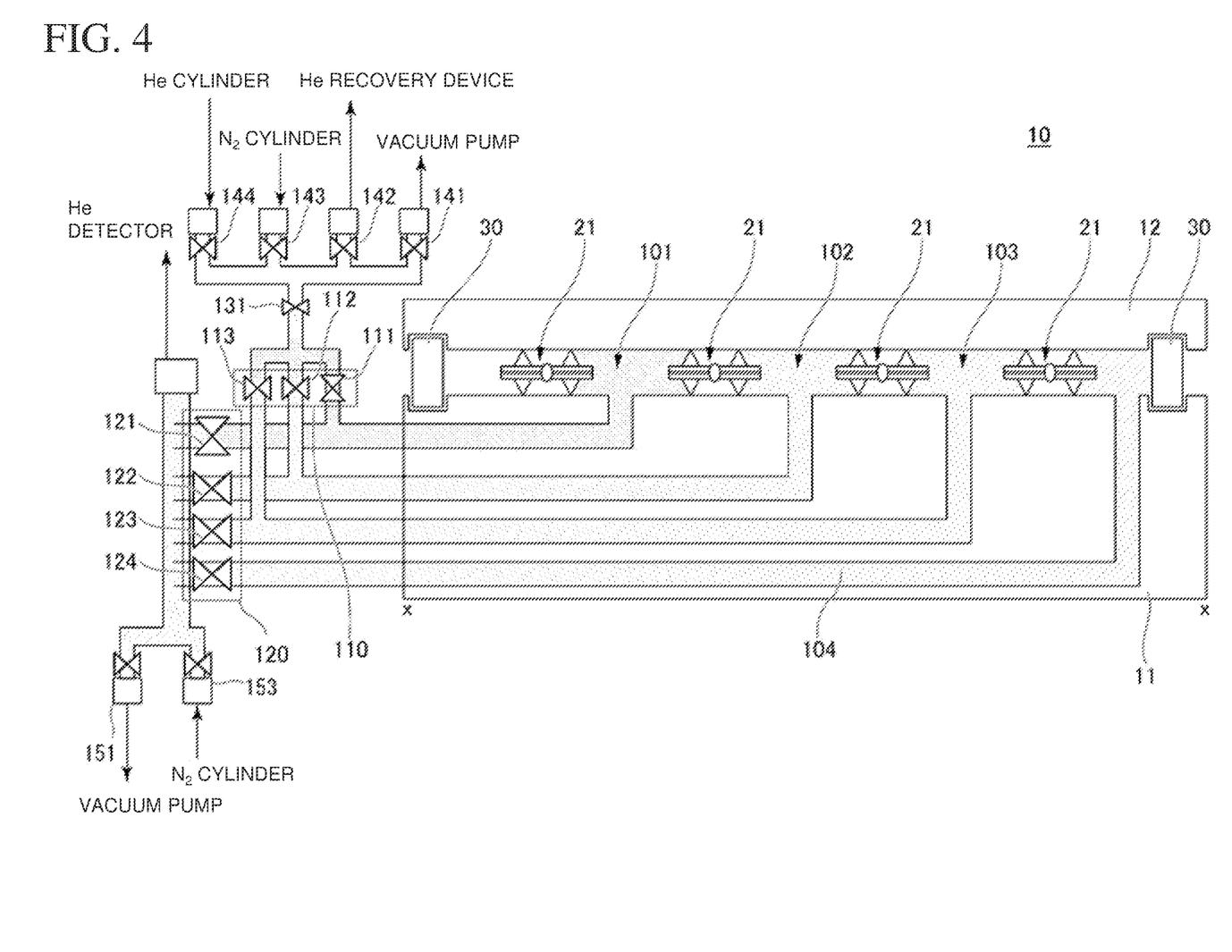
FIG. 4 illustrates the seal inspection device according to the embodiment 1 in a state of the time of inspection.

FIG. 4 illustrates the seal inspection device 10 according to the present embodiment in a state of S7, i.e., in a state of the time of the inspection. When a leak occurs at the part that is included in the inspection target seal 21 and that surrounds the area 22 including both of the two A ports 101, He atoms reach the He detector via the measurement-valve group 120 from at least one of the B port 102, the C port 103, and the outside-leak detection flow path 104, as illustrated in FIG. 4. The number of these He atoms is measured so that occurrence or non-occurrence of a He leak can be detected, and further, a leak amount can be detected.

After S7 is ended, the He-cylinder-side valve 144 is closed (S8).

Next, the He-recovery-device-side valve 142 is opened to recover the He gas (S9). Thus, the used He gas can be recovered so that the helium He gas once used can be reused.

A He recovery device may be connected also to the side of the He detector. In this case, the leaked He gas can be recovered.

Next, after the He gas is recovered, all the valves of the pressurization-valve group 110 and the measurement-valve group 120 are opened (S10).

Then, the nitrogen-cylinder-side valve 143 is opened to scavenge with a nitrogen gas (S11), and the processing is ended.

By this scavenging, the helium (He) gas remaining in the flow paths and the sample can be brought out. Thus, erroneous detection caused by the remaining helium (He) gas can be prevented in next and subsequent inspection.

The nitrogen-cylinder-side valve 153 connected to the nitrogen cylinder is connected to the side of the He detector. Accordingly, the scavenging is possible also from the side of the He detector. Thereby, time taken for the scavenging can be shortened.

In the conventional technique, an evacuatable chamber is used to detect a trace of leakage from an inspection target arranged in the chamber. However, using the chamber results in existence of at least two working parts that include an operating part of the chamber and a part holding the inspection target. Accordingly, it takes time and work to replace the inspection target, and it is difficult to perform an inspection in a short time.

When inspection targets include a defective product, an amount of leakage is large, and for this reason, the entire chamber is scavenged, and it takes time to scavenge.

When a chamber is used, a pipe is used in the chamber. When there are a plurality of inspection targets, connection of the pipe is changed for each of the inspection targets. Thus, time and work are taken, and further, there is a possibility of leakage caused by the connection change of the pipe.

In addition, an inside of the chamber and the detector are evacuated, and further, an inside of the workpiece is evacuated in some cases. Thus, a plurality of vacuum pumps are used, and a device configuration is complicated.

According to the present embodiment, its implementation is possible by evacuating an extremely limited space around the inspection target without using a chamber, differently from the conventional technique. Thus, the device configuration can be simplified, and thereby a risk of malfunction and cost can be reduced.

According to the present embodiment, a chamber is not used. Thus, its implementation is possible by evacuating an extremely limited space around the inspection target, and the inspection can be performed in a short time.

According to the present embodiment, the number of He atoms is measured. Thus, its implementation is possible without depending on a temperature of an environment.

As described above, according to the present embodiment, it is possible to implement the seal inspection device that enables the inspection to be performed with higher accuracy and in a shorter time than in the conventional case and that has a simple structure.

According to the present embodiment, a plurality of the inspection target ports are provided, and the first measurement valves associated with a plurality of the respective inspection target ports are opened and closed so that the inspection target can be switched between the ports. Thus, pipe change, i.e., pipe reconnection is unnecessary.

In the present embodiment, the inspection target may be automatically switched between the ports by a configuration that automatically opens and closes the first measurement valves.

The above description in the present embodiment concerns the time of the inspection of the first port that is the A port. However, the present invention is not limited to this.

The flowchart illustrated in FIG. 3 is applied so that leakage in the B port can be detected by switching the inspection target to the B port, and leakage in the C port can be detected by switching the inspection target to the C port.

Embodiment 2

The description in the embodiment 1 concerns the mode where one port is the inspection target. However, the present invention is not limited to this. The description in the present embodiment concerns a mode where two ports are the inspection targets.

The description is omitted for the matters similar to those in the embodiment 1, and the description of the embodiment 1 applies to these matters.

In the present embodiment, the seal inspection device 10 illustrated in FIG. 2 is used similarly to the embodiment 1.

A seal inspection method according to the present embodiment is performed in the procedure illustrated in the flowchart of FIG. 3, similarly to the embodiment 1.

Here, the A port and the B port are the inspection targets, and the inspection target sample is set at a predetermined position. Then, processing is started. The steps S1 to S3 are similar to those in the embodiment 1.

All the valves of the pressurization-valve group 110 are closed at S3. Then, the A-port measurement valve 121 connected to the A port 101 as the inspection target and the B-port measurement valve 122 connected to the B port 102 as the inspection target are closed (S4) in a state where the measurement valve 123 for the C port as a non-target of inspection and the outside-leak measurement valve 124 are opened. At this time, the vacuum-pump-side valve 141 is also closed.

Then, the He-cylinder-side valve 144 is opened to supply a He gas (S5).

Next, the A-port pressurization valve 111 and the B-port pressurization valve 112 are opened, in a state where the C-port pressurization valve 113 is closed, to supply a He gas to the space including the A port 101 as the inspection target port and a space including the B port 102 as the inspection target port (S6).

Then, the exhaust-side and intake-side valve 131 is closed.

Next, the number of He atoms is measured by the He detector (S7).

Here, a leak amount is measured that is an amount of the He gas supplied to the A port 101 and the B port 102 and leaked from the inspection target seal 21 to the C port 103 or the outside-leak detection flow path 104.

Pressurization is continued during the measurement at S7.

The valve is opened for the pressurization at the time of the pressurization. However, the valve may be closed when sufficient pressure is maintained.

Figure 5:
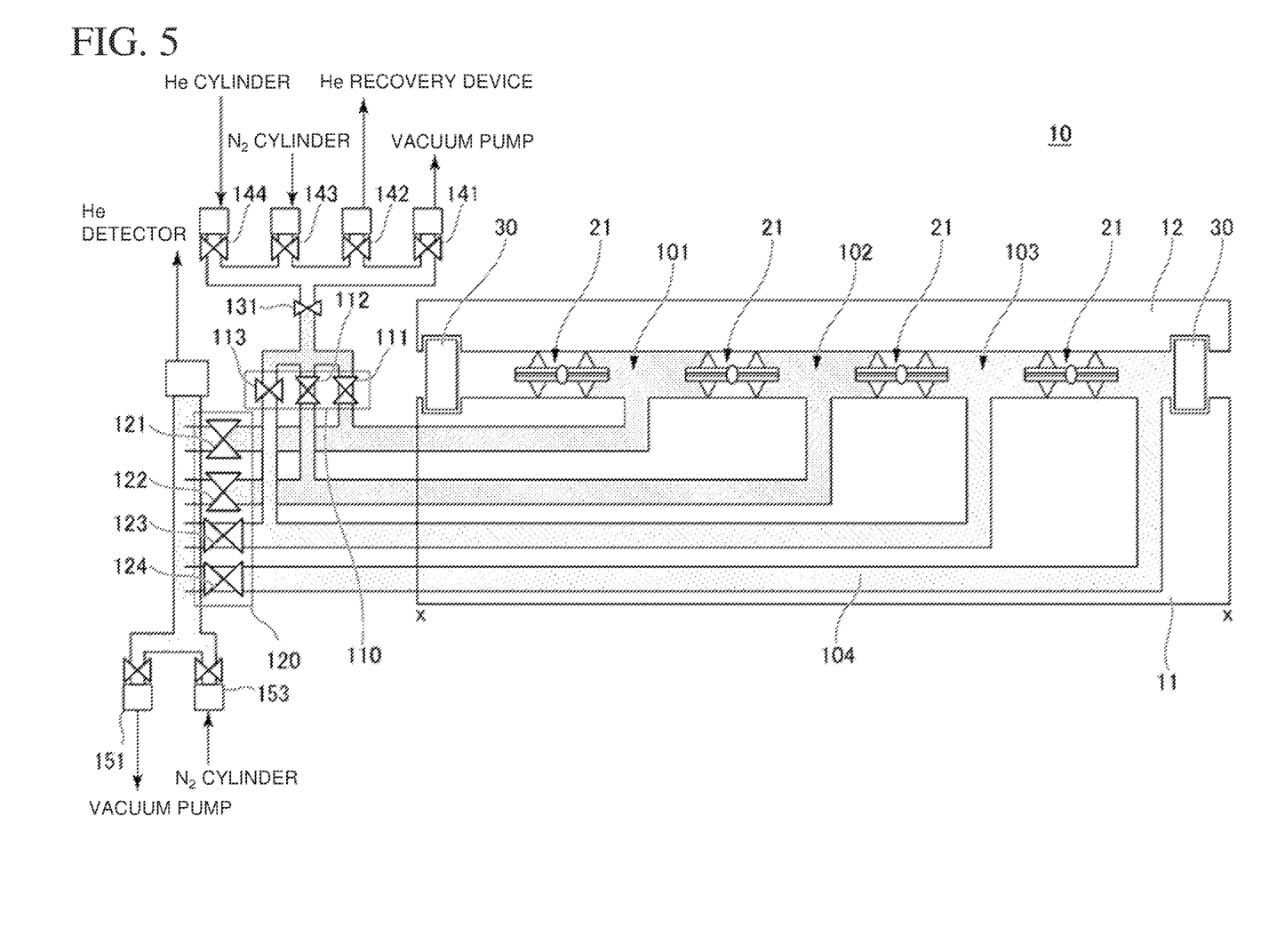
FIG. 5 illustrates a seal inspection device according to an embodiment 2 in a state of the time of inspection.

FIG. 5 illustrates the seal inspection device 10 according to the present embodiment in a state of S7, i.e., in a state of the time of inspection. The inspection target seal 21 includes the part surrounding the area 22 including both of the two A ports 101 and the parts surrounding the B ports 102. When a leak occurs at one or more of these parts, He atoms reach the He detector from one or both of the C port 103 and the outside-leak detection flow path 104 via the measurement-valve group 120, as illustrated in FIG. 5. The number of these He atoms is measured so that occurrence or non-occurrence of a He leak can be detected, and further, a leak amount can be detected.

The steps S8 to S11 after the end of S7 are similar to those in the embodiment 1, and the processing is ended after S11.

According to the present embodiment, when a leak occurs at one or both of the two ports, this can be detected.

Embodiment 3

The description in the embodiments 1 and 2 concerns the mode where one or two ports are the inspection targets. However, the present invention is not limited to these. The description in the present embodiment concerns a mode where all three ports are the inspection targets.

The description is omitted for the matters similar to those in the embodiment 1, and the description of the embodiment 1 applies to these matters.

Also in the present embodiment, the seal inspection device 10 illustrated in FIG. 2 is used similarly to the embodiments 1 and 2. A seal inspection method according to the present embodiment is performed in the procedure illustrated in the flowchart of FIG. 3, similarly to the embodiment 1.

Here, the A port, the B port, and the C port are the inspection targets, and the inspection target sample is set at a predetermined position. Then, processing is started. The steps S1 to S3 are similar to those in the embodiment 1.

All the valves of the pressurization-valve group 110 are closed at S3. Then, the A-port measurement valve 121 connected to the A port 101 as the inspection target, the B-port measurement valve 122 connected to the B port 102 as the inspection target, and the C-port measurement valve 123 connected to the C port 103 as the inspection target are closed (S4) in a state where the outside-leak measurement valve 124 is opened. At this time, the vacuum-pump-side valve 141 is also closed.

Then, the He-cylinder-side valve 144 is opened to supply a He gas (S5).

Next, the A-port pressurization valve 111, the B-port pressurization valve 112, and the C-port pressurization valve 113 are opened to supply a He gas to the space including the A port 101 as the inspection target port, the space including the B port 102 as the inspection target port, and a space including the C port 103 as the inspection target port (S6).

Then, the exhaust-side and intake-side valve 131 is closed.

Next, the number of He atoms is measured by the He detector (S7).

Thereby, a leak amount is measured that is an amount of the He gas supplied to the A port 101, the B port 102, and the C port 103 and leaked from the inspection target seal 21 to the outside-leak detection flow path 104.

Pressurization is continued during the measurement at S7.

The valve is opened for the pressurization at the time of the pressurization. However, the valve may be closed when sufficient pressure is maintained.

Figure 6:
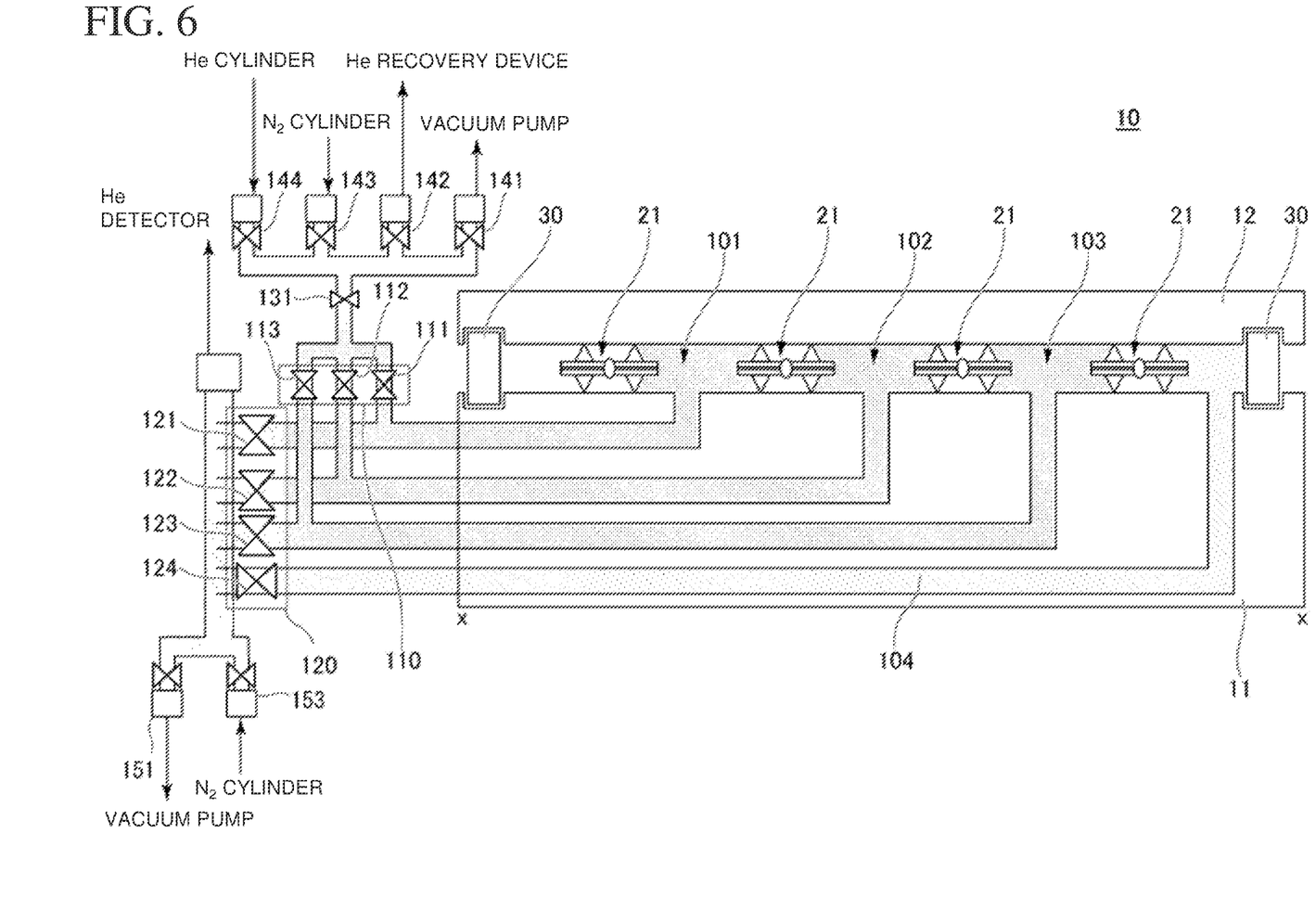
FIG. 6 illustrates a seal inspection device according to an embodiment 3 in a state of the time of inspection.

FIG. 6 illustrates the seal inspection device 10 according to the present embodiment in a state of S7, i.e., in a state of the time of inspection. The inspection target seal 21 includes the part surrounding the area 22 including both of the two A ports 101, the parts surrounding the B ports 102, and the parts surrounding the C ports 103. When a leak occurs at one or more of these parts, He atoms reach the He detector from the outside-leak detection flow path 104 via the measurement-valve group 120, as illustrated in FIG. 6. The number of these He atoms is measured so that occurrence or non-occurrence of a He leak can be detected, and further, a leak amount can be detected.

The steps S8 to S11 after the end of S7 are similar to those in the embodiment 1, and the processing is ended after S11.

According to the present embodiment, when a leak occurs at one of the three ports, this can be detected.

Embodiment 4

A basic configuration of the seal inspection device 10 according to the present embodiment is the same as that of the embodiment 1. Hereinafter, the description of the same configuration as that of the embodiment 1 is omitted, and a configuration different from that of the embodiment 1 is described.

Figure 7:
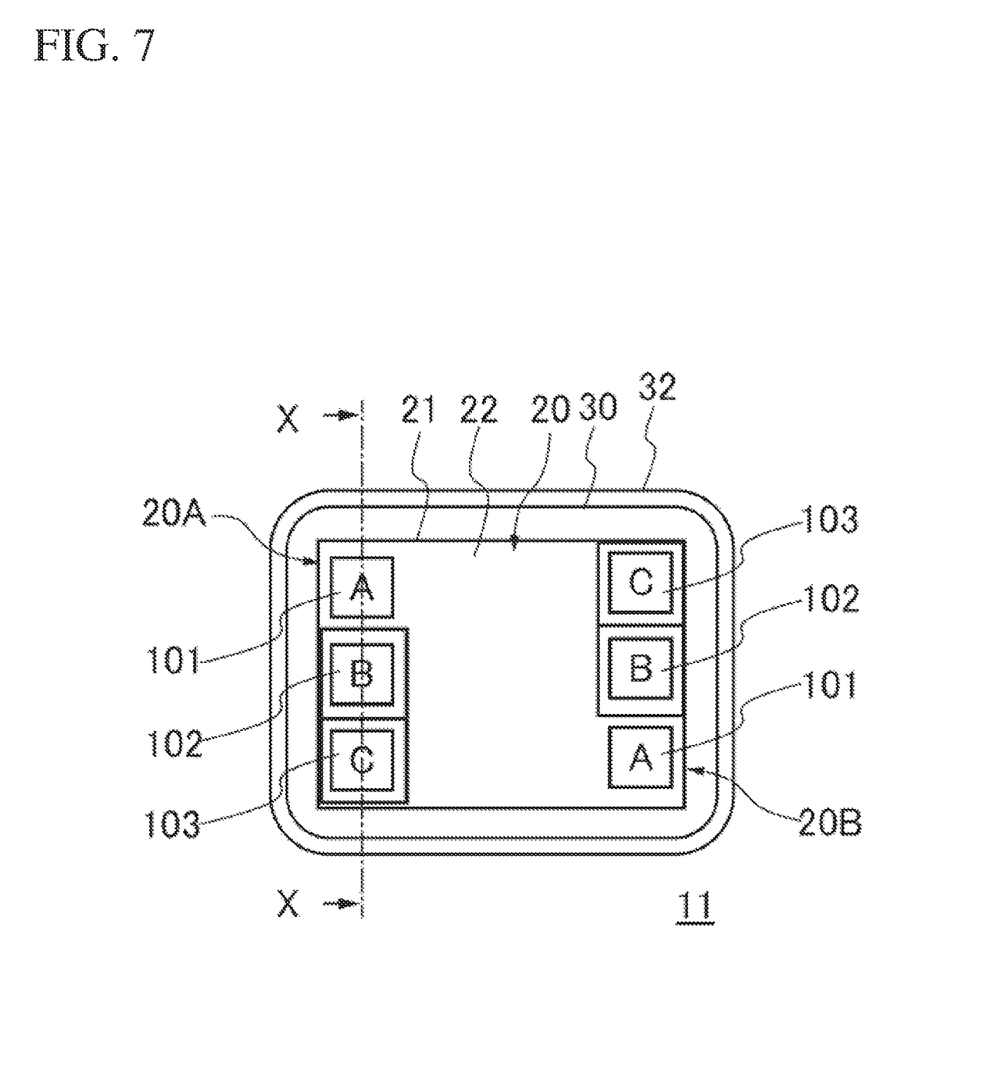
FIG. 7 illustrates a state where a sample is arranged on a lower holder provided in a seal inspection device according to an embodiment 4.

FIG. 7 illustrates a state where the sample 20 is arranged on the lower holder 11 provided in the seal inspection device 10 according to the present embodiment. The sample 20 is surrounded by the inspection-place sealing portion 30, as illustrated in FIG. 7. Further, the inspection-place sealing portion 30 is surrounded by a peripheral sealing portion 32. The inspection-place sealing portion 30 and the peripheral sealing portion 32 define an evacuated space 34. The peripheral sealing portion 32 may be a gasket for example, but is not limited to this. A gasket made of rubber is particularly preferable as the peripheral sealing portion 32.

Figure 8:
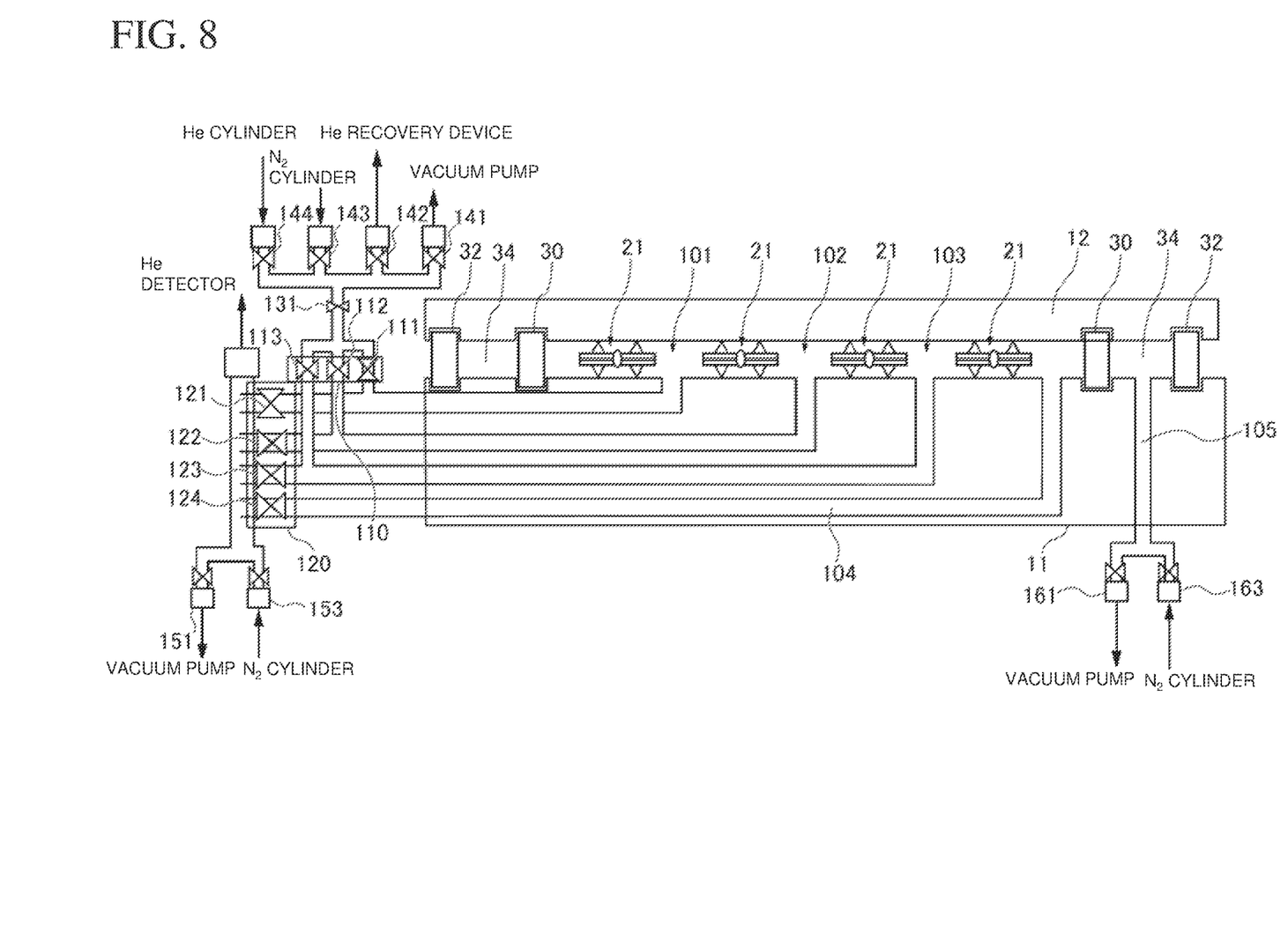
FIG. 8 illustrates an entire configuration of the seal inspection device according to the embodiment 4.

FIG. 8 illustrates an entire configuration of the seal inspection device 10 according to the present embodiment. FIG. 8 includes a cross-sectional view of X-X illustrated in FIG. 7.

A flow path 105 is provided in the lower holder 11 so as to be between the inspection-place sealing portion 30 and the peripheral sealing portion 32. The flow path 105 is connected to a vacuum pump. However, the present invention is not limited to this. It suffices that at least a through hole connected to the flow path 105 is provided in the lower holder 11.

A vacuum-pump-side valve 161 and a nitrogen-cylinder-side valve 163 are connected to the flow path 105. The vacuum-pump-side valve 161 is connected to a vacuum pump. The nitrogen-cylinder-side valve 163 is connected to a nitrogen cylinder.

Next, a seal inspection method according to the present embodiment is performed in the procedure illustrated in the flowchart of FIG. 3, similarly to the embodiment 1.

Here, the A port and the B port are the inspection targets, and the inspection target sample is set at a predetermined position. Then, processing is started.

First, the upper holder 12 is lowered in a state where the inspection target sample is set, and the sample 20 including the inspection target seal 21 as the inspection target is thereby compressed between the lower holder 11 and the upper holder 12 (S1). At this time, the vacuum-pump-side valve 161 is opened so that the vacuum pump and the flow path 105 are connected to each other to evacuate the evacuated space 34. Thereby, the lower holder 11 and the upper holder 12 are attracted to each other so that the sample 20 is compressed.

The steps S2 to S11 are similar to those in the embodiment 1.

According to the present embodiment, the compressed state of the sample 20 can be maintained more reliably.

In the embodiments 1 to 4, the flow path extending from each of the A port, the B port, and the C port is formed into a bent shape in the lower holder 11. However, the present invention is not limited to this. Through holes may be provided, in a plate-shaped member, as the A port, the B port, and the C port, and pipes may be bent so as to form the flow paths.

Alternatively, respective configurations connected to these flow paths may be appropriately arranged on a lower side of the plate-shaped member where the through holes are provided. Thereby, bent parts are reduced as much as possible, and the flow paths are shortened.

In the embodiments 1 to 4, all of the A port, the B port, and the C port are provided in the lower holder 11. However, the present invention is not limited to this, and the A port, the B port, and the C port may be provided in the upper holder 12.

Similarly, the through hole connected to the outside-leak detection flow path 104 may be provided in the upper holder 12 or in the lower holder 11.

In other words, the flow paths from the A port, the B port, and the C port, and the outside-leak detection flow path 104 may have a route from the lower holder 11, or may have a route from the upper holder 12.

The embodiments 1 to 4 are configured such that the inspection target is sandwiched between the upper holder and the lower holder, and the two holders are moved up and down. However, the present invention is not limited to this.

The two holders may be configured to be moved left and right, and a movement direction of the two holders are not particularly limited.

When the port is switched to be the inspection target to continuously inspect a plurality of the ports in the embodiments 2 and 3, scavenging is unnecessary for the part pressurized both before and after the switching of the port.

For example, when the A port 101 is inspected as described in the embodiment 1, and the A port 101 and the B port 102 are next inspected as described in the embodiment 2 by switching the port to be the inspection target, scavenging of the port A 101 is unnecessary. This is because the A port is the part pressurized before and after the switching of the port.

Thus, the valves for the ports that do not need to be scavenged are closed at the time of the scavenging.

The cell seal of the fuel cell is exemplified above as the field to which the present invention can be applied. However, the present invention is not limited to this, and can be applied to any field where high sealing performance is desired for an applied seal.

The invention claimed is:

1. A seal inspection device comprising:
   a first holder including
      a port surrounded by an inspection target, and
      a through hole connected to an outside-leak detection flow path;
   a second holder configured to hold the inspection target between the first and second holders;
   an inspection-place sealing portion configured to form, into a closed space, a space where the inspection target is arranged, in cooperation with the first holder and the second holder;
   a pressurization valve configured to connect the port to both a supply source of an inspection gas and an exhaust system;
   a detector for the inspection gas;
   a first measurement valve configured to connect the detector to the port; and
   a second measurement valve configured to connect the outside-leak detection flow path to the detector.

2. The seal inspection device according to claim 1, wherein the first holder includes a plurality of the ports, the seal inspection device further comprising a plurality of the first measurement valves that are associated with a plurality of the respective ports and that switch the inspection target between the ports by being opened and closed.

3. The seal inspection device according to claim 2, wherein the inspection gas includes a helium gas or a hydrogen gas.

4. The seal inspection device according to claim 2, further comprising an inspection gas recovery device that is connected to a path of the inspection gas and that recovers the inspection gas.

5. The seal inspection device according to claim 2, wherein the detector is a number-of-atoms measurement device.

6. The seal inspection device according to claim 2, further comprising:
   a peripheral sealing portion that surrounds a perimeter of the inspection-place sealing portion and that defines an evacuated space between the inspection-place sealing portion and the peripheral sealing portion; and
   a vacuum-pump-side valve configured to connect the evacuated space to a vacuum pump.

7. The seal inspection device according to claim 1, wherein the inspection gas includes a helium gas or a hydrogen gas.

8. The seal inspection device according to claim 7, further comprising an inspection gas recovery device that is connected to a path of the inspection gas and that recovers the inspection gas.

9. The seal inspection device according to claim 7, wherein the detector is a number-of-atoms measurement device.

10. The seal inspection device according to claim 7, further comprising:
    a peripheral sealing portion that surrounds a perimeter of the inspection-place sealing portion and that defines an evacuated space between the inspection-place sealing portion and the peripheral sealing portion; and
    a vacuum-pump-side valve configured to connect the evacuated space to a vacuum pump.

11. The seal inspection device according to claim 1, further comprising an inspection gas recovery device that is connected to a path of the inspection gas and that recovers the inspection gas.

12. The seal inspection device according to claim 11, wherein the detector is a number-of-atoms measurement device.

13. The seal inspection device according to claim 1, wherein the detector is a number-of-atoms measurement device.

14. The seal inspection device according to claim 1, further comprising:
    a peripheral sealing portion that surrounds a perimeter of the inspection-place sealing portion and that defines an evacuated space between the inspection-place sealing portion and the peripheral sealing portion; and
    a vacuum-pump-side valve configured to connect the evacuated space to a vacuum pump.

15. A seal inspection method comprising: holding an inspection target between a first holder and a second holder, and evacuating an inside of the inspection target, thereby forming a closed space in a vacuum state surrounded by the inspection target, the inspection target being arranged so as to surround each of a port and a through hole, the port being provided in the first holder, the through hole being connected to an outside-leak detection flow path; introducing an inspection gas into a first closed space area that is included in the closed space and that includes the port to be a measurement target; and detecting the inspection gas that has leaked to a second closed space area included in the closed space and other than the port as the measurement target.

16. The seal inspection method according to claim 15, further comprising:
    opening and closing a plurality of first measurement valves associated with a plurality of the respective ports, thereby switching the measurement target between the ports.

17. The seal inspection method according to claim 15, wherein the inspection gas includes a helium gas or a hydrogen gas.

18. The seal inspection method according to claim 15, further comprising:
    recovering the inspection gas.

19. The seal inspection method according to claim 15, further comprising: by a number-of-atoms measurement device, detecting the inspection gas that has leaked to the second closed space area included in the closed space and other than the port as the measurement target.

20. The seal inspection method according to claim 15, further comprising:
    evacuating an evacuated space that surrounds a perimeter of the port as the measurement target.

* * * * *